United States Patent [19]

Dubrow et al.

[11] Patent Number: 5,079,300
[45] Date of Patent: Jan. 7, 1992

[54] METHOD OF CURING ORGANPOLYSILOXANE COMPOSITIONS AND COMPOSITIONS AND ARTICLES THEREFROM

[75] Inventors: Robert S. Dubrow, San Carlos; Subbu S. Venkatraman, Palo Alto; Albert J. Highe, Redwood City; Frank W. Mercer, Blemont, all of Calif.; Christian A. Debbaut, Apex, N.C.

[73] Assignee: Raychem Corporation, Menlo Park, Calif.

[21] Appl. No.: 488,806

[22] Filed: Mar. 5, 1990

Related U.S. Application Data

[63] Continuation-in-part of Ser. No. 7,317,703, Mar. 1, 1989, abandoned.

[51] Int. Cl.$^5$ ............................................. C05F 8/00
[52] U.S. Cl. .................................. 525/106; 525/464; 525/474; 525/477; 525/478; 528/15; 528/25; 528/26; 528/27; 528/30; 528/31; 528/32; 528/34; 528/37; 528/38; 528/41
[58] Field of Search .......................... 528/15, 25, 26, 27, 528/30, 31, 32, 34, 37, 38, 41; 525/106, 464, 474, 477, 478

[56] References Cited

U.S. PATENT DOCUMENTS

| | | | |
|---|---|---|---|
| 3,445,420 | 0/1969 | Kookootuedes | 260/37 |
| 3,624,022 | 0/1971 | Ross | 260/37 |
| 4,064,207 | 0/1977 | Gant | 260/46.5 |
| 4,163,081 | 0/1979 | Schulz | 428/429 |
| 4,196,273 | 0/1980 | Imai | 528/15 |
| 4,364,809 | 0/1982 | Sato et al. | 525/925 |
| 4,595,635 | 0/1986 | Dubrow et al. | 428/447 |
| 4,600,261 | 0/1986 | Debbaut | 339/116 |
| 4,634,207 | 0/1987 | Debbaut | 339/116 |
| 4,777,063 | 0/1988 | Dubrow et al. | 427/44 |
| 4,973,642 | 11/1990 | Donatelli et al. | 528/15 |

FOREIGN PATENT DOCUMENTS

| | | |
|---|---|---|
| 108518A2 | of 1984 | European Pat. Off. . |
| 200557A2 | of 1986 | European Pat. Off. . |
| 203738A2 | of 1986 | European Pat. Off. . |
| 204427A2 | of 1986 | European Pat. Off. . |
| 295881A2 | of 1988 | European Pat. Off. . |

*Primary Examiner*—John C. Bleutge
*Assistant Examiner*—Margaret W. Glass
*Attorney, Agent, or Firm*—Yuan Chao; Herbert G. Burkhard

[57] ABSTRACT

The present invention provides curable gel compositions and also cured gel compositions which possess unexpectedly superior combinations of physical properties and aging resistance. These compositions are particularly useful for environmentally protecting substrates especially electrical conductors, connectors and splices and for sealing around jacketed cables, for example, where they enter splice cases.

22 Claims, 8 Drawing Sheets

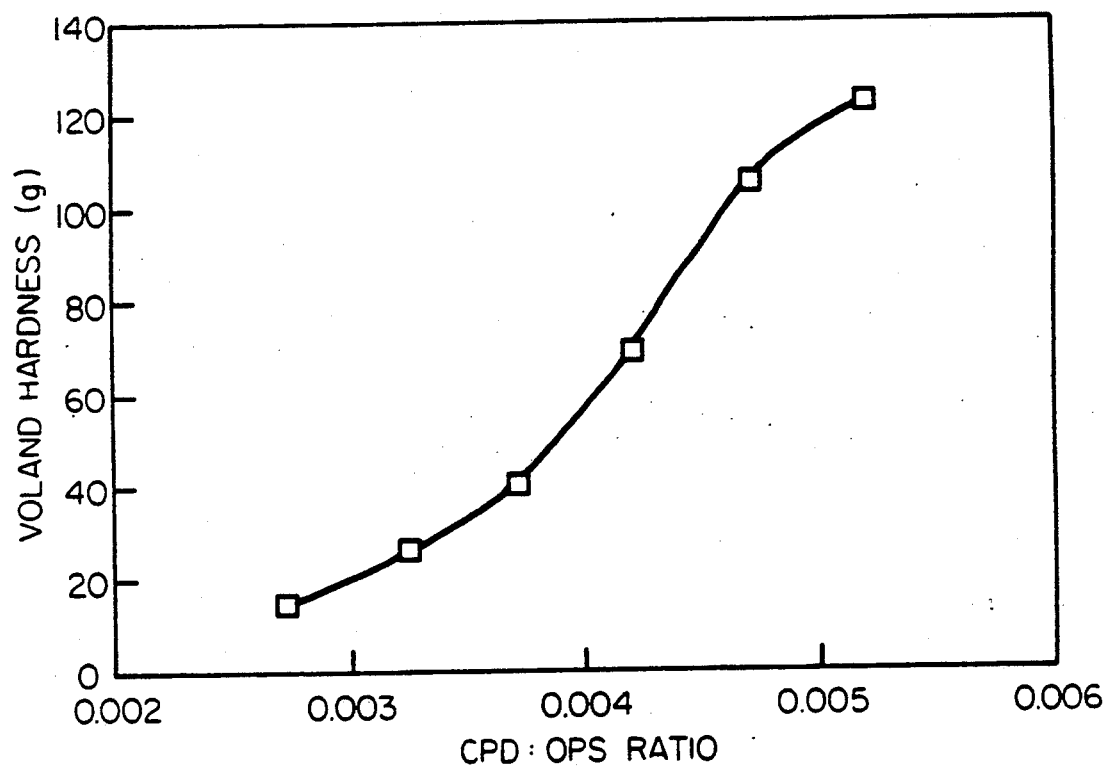
FIG_1

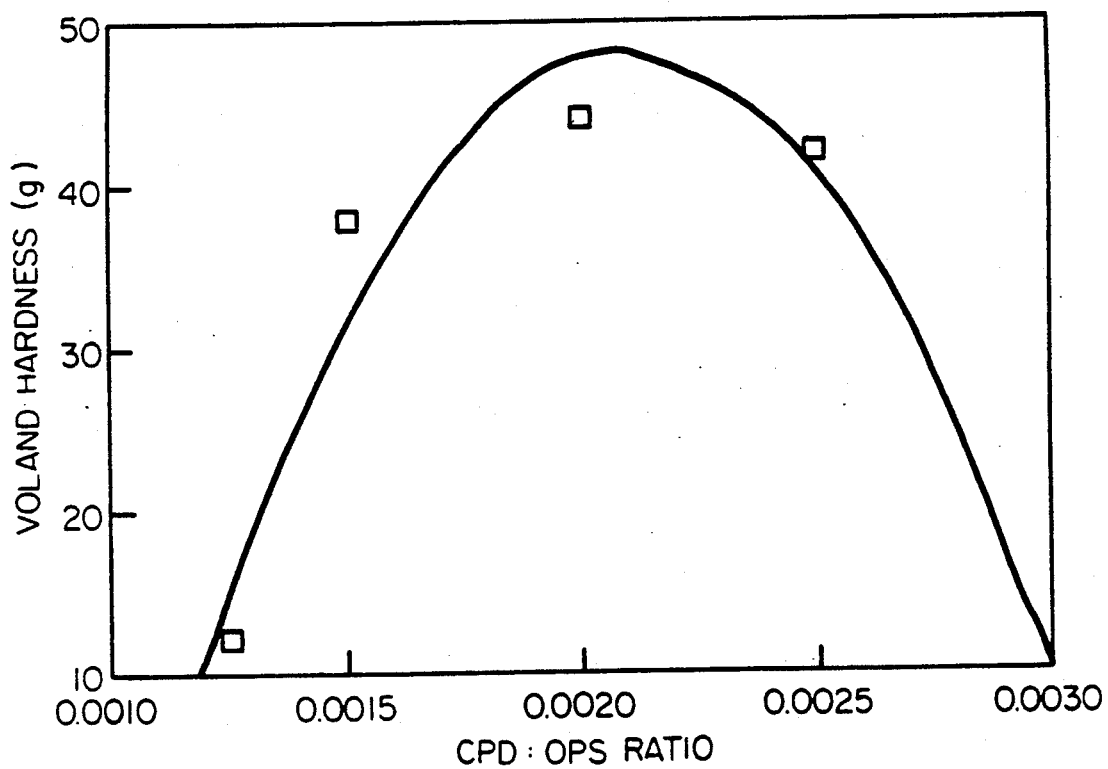
FIG_2

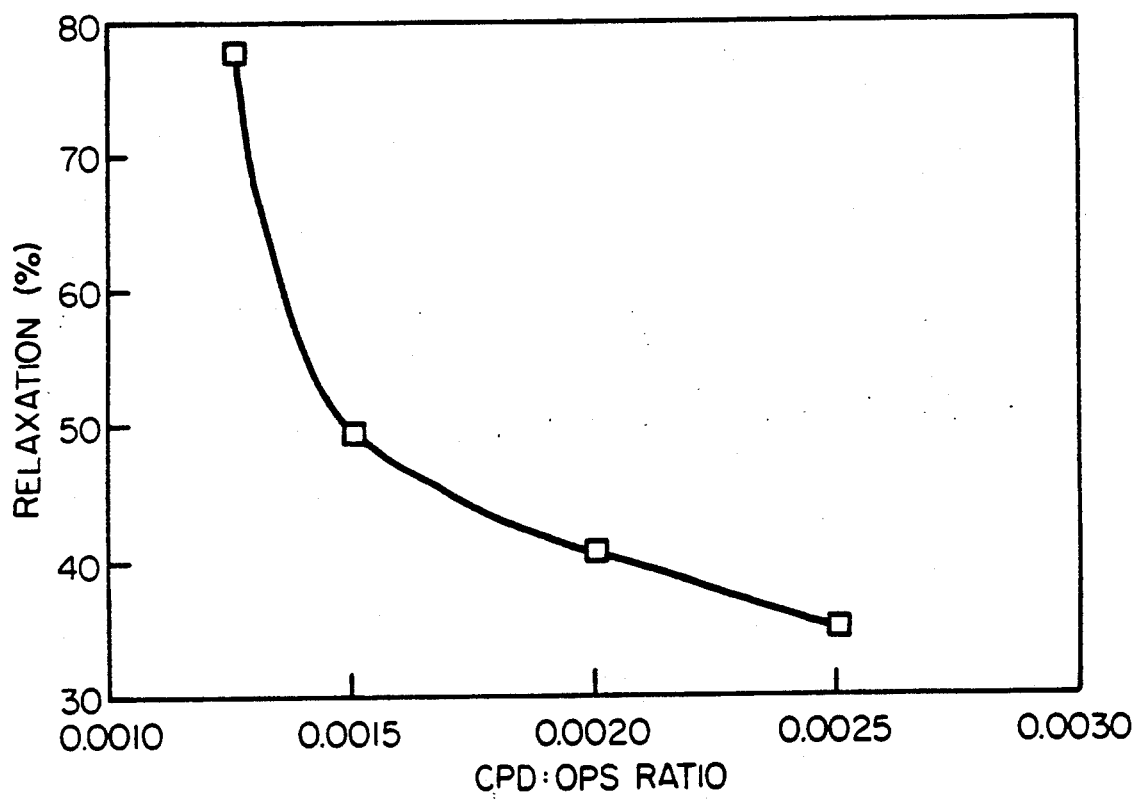
FIG_3

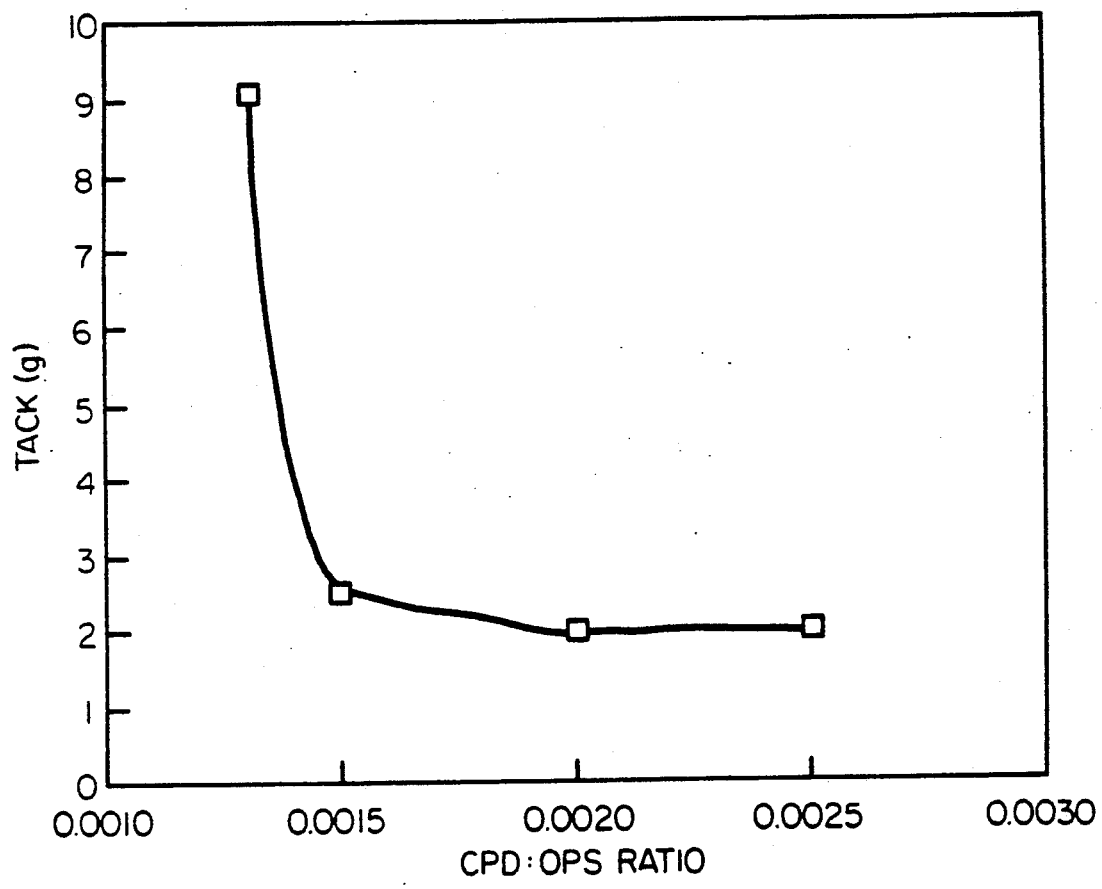
FIG_4

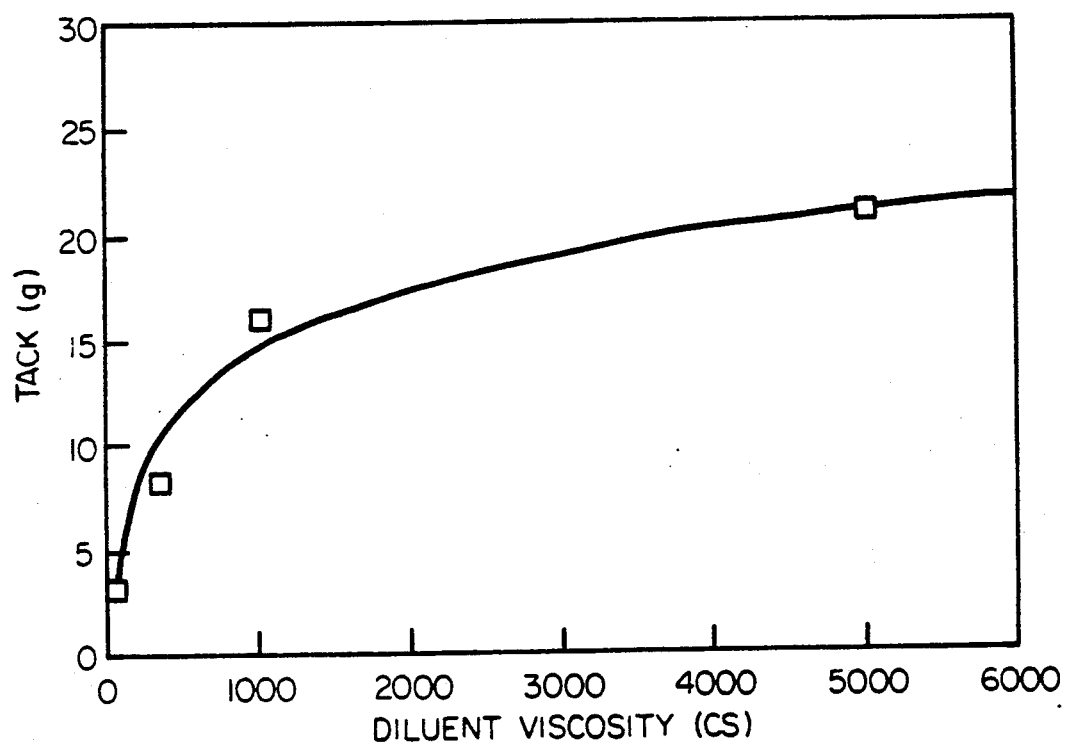
FIG_5

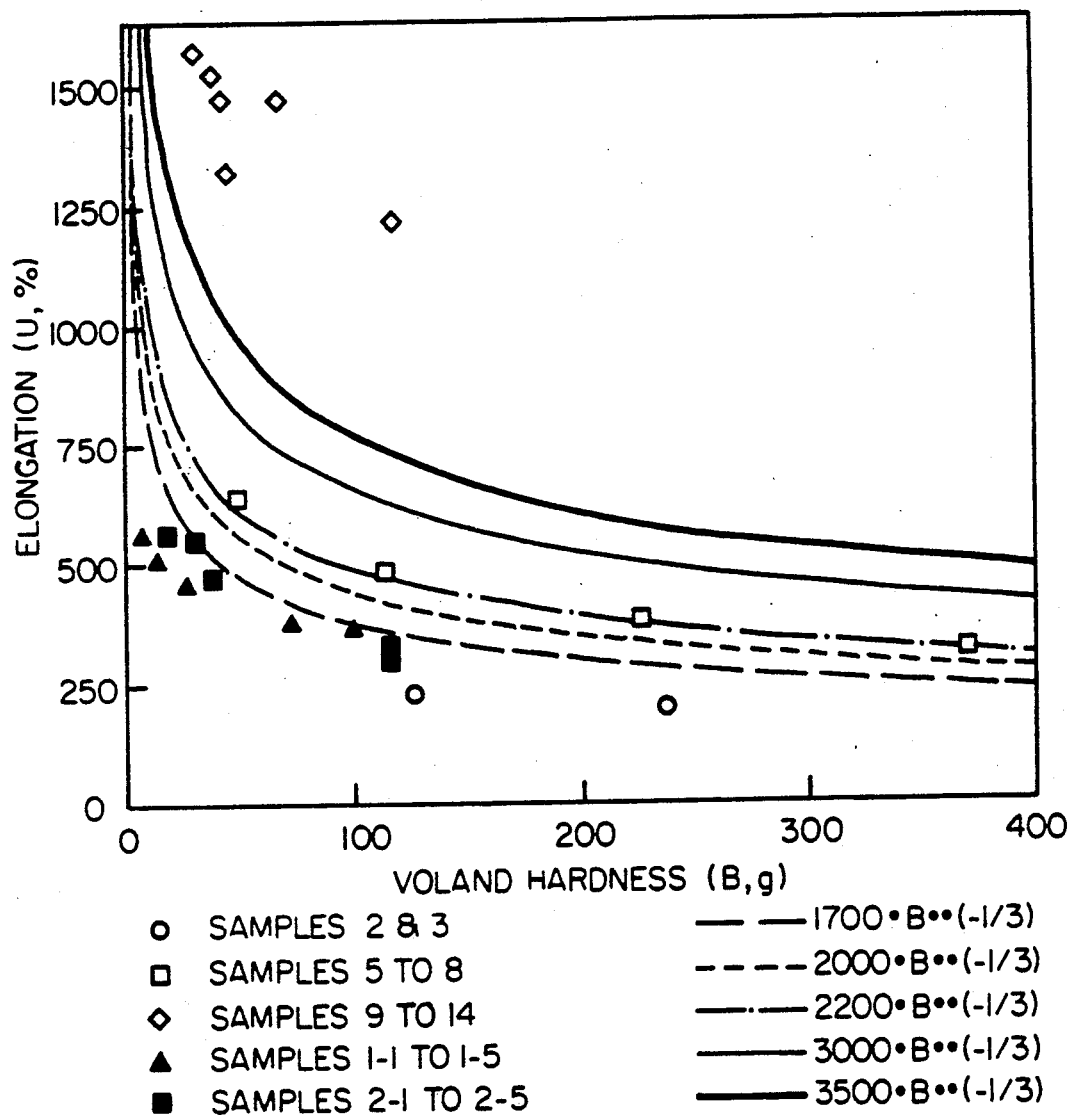
FIG_6

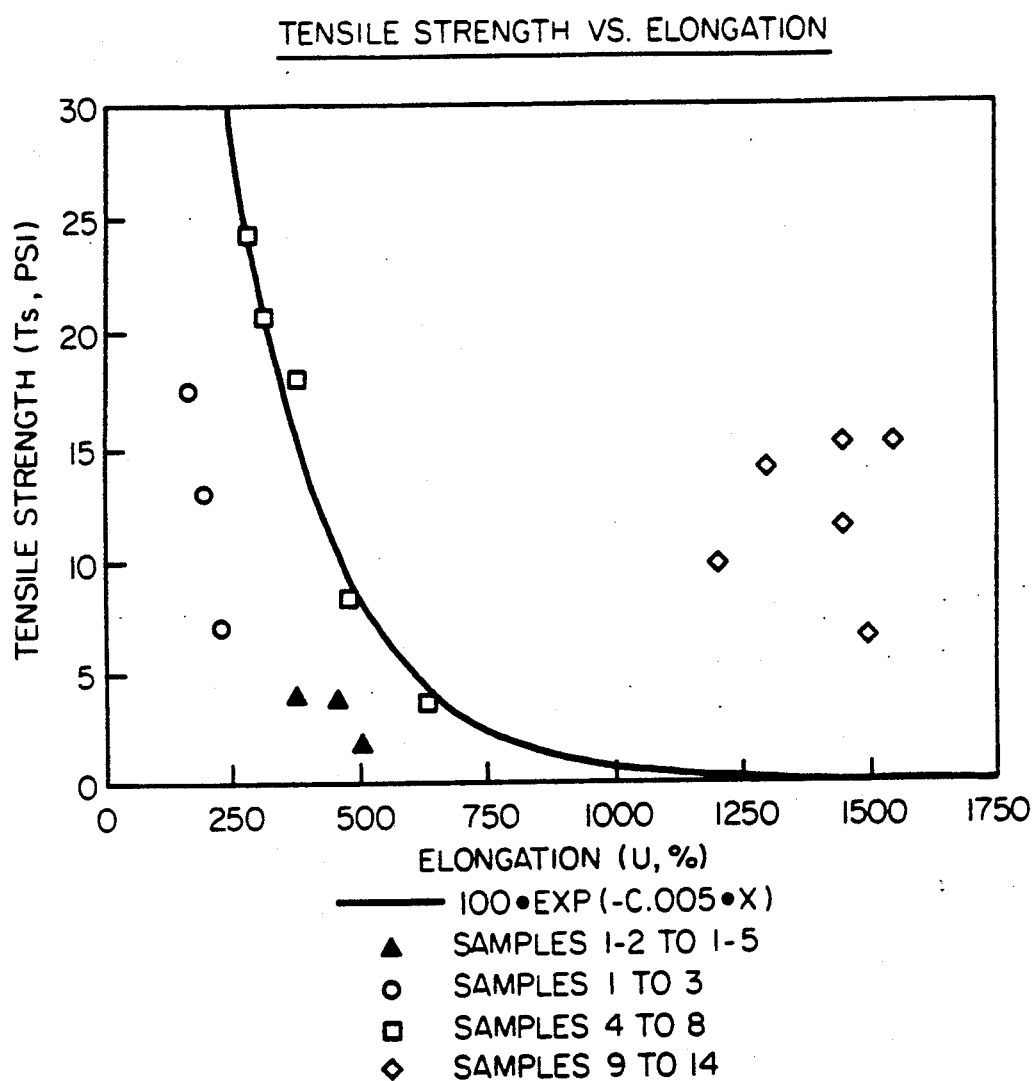
FIG_7

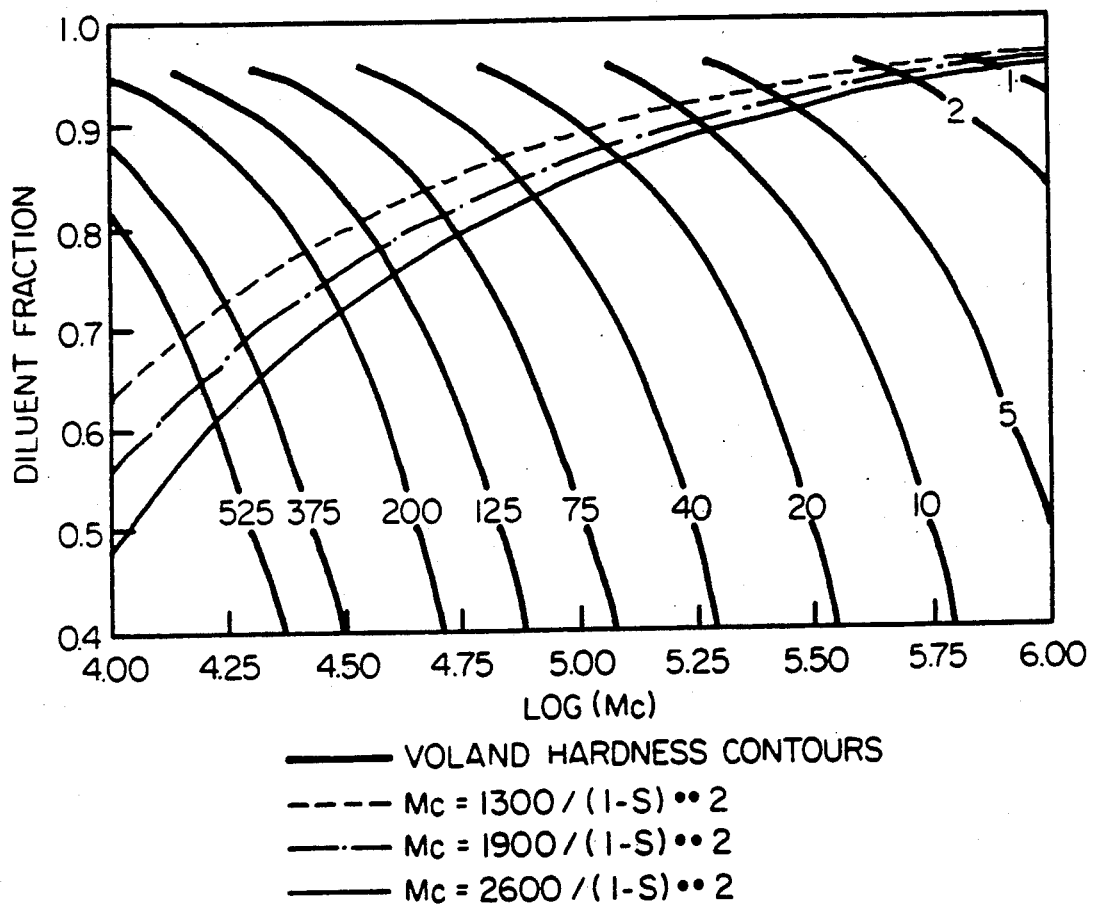
FIG_8

METHOD OF CURING ORGANPOLYSILOXANE COMPOSITIONS AND COMPOSITIONS AND ARTICLES THEREFROM

CROSS REFERENCE TO RELATED CROSS REFERENCE

This application is a continuation-in-part of copending application Ser. No. 07/317,703 filed Mar. 1, 1989, now abandoned.

FIELD OF THE INVENTION

This invention relates to cured organopolysiloxane gel compositions, their use, their preparation and to articles comprising said compositions. More particularly, this invention relates to novel cured organopolysiloxane gel compositions having unexpectedly superior combinations of elongation, tensile strength, and toughness, accepting high levels of diluent without significant syneresis, particularly while under compression, while maintaining beneficial tack properties essential for gel sealant compositions. In particular, this invention relates to cured organopolysiloxane gel compositions useful for environmentally sealing and protecting substrates especially electrical conductors, connectors and splices and for sealing around jacketed cables, for example, where they enter splice cases.

BACKGROUND OF THE INVENTION

Cured gels including silicone gels have been suggested for a wide variety of applications to environmentally seal and protect substrates such as electrical connections, bare electrical conductors and splices and in other non-electrical applications such as the protection of metallic structures from corrosion, for example, by sea-water.

Cured silicone products having a wide range of properties useful in a wide range of applications are well known, as is the formation of those products by curing organopolysiloxanes by crosslinking individual organopolysiloxanes or mixtures of various organopolysiloxanes. One particular family of organopolysiloxanes, for example, which are useful in forming adhesives and other materials are those diorganopolysiloxanes which are terminated at either or both ends of the chain with vinyl groups. Examples of such vinyl terminated polysiloxanes appear in U.S. Pat. No. 4,196,273 to Imai et al. Vinyl terminated polysiloxanes may be crosslinked with themselves or with other polysiloxanes containing various functional groups such as aryl, aliphatic (saturated or unsaturated), and fluoroaliphatic moieties (such as $CF_3CH_2CH_2$—) or containing other groups such as nitrogen groups, sulphur groups and the like. Examples of such organopolysiloxanes are shown in U.S. Pat. Nos. 3,624,022 to Ross, 4,064,027 to Gant, 4,163,081 to Schulz and 3,445,420 to Kookootuedes. Diorganopolysiloxanes terminated at the chain ends with two or three vinyl groups have been crosslinked to provide elastomeric or rubber-type products, as shown in U.S. Pat. No. 4,364,809 to Sato et al.

Commonly assigned copending U.S. application Ser. No. 730,402 filed May 2, 1985, now U.S. Pat. No. 4,777,063, the disclosure of which is completely incorporated herein by reference for all purposes, discloses novel curable organopolysiloxane compositions comprising at least about 50% by weight of a general organopolysiloxane having no more than two vinyl groups and up to about 50% by weight of a crosslink additive which is a polysiloxane having at least 3 vinyl groups and which is copolymerizable with the organopolysiloxane. This curable composition may be cured by heat, chemical or, preferably, radiation curing techniques to produce crosslinked polysiloxane materials.

In recent years, as disclosed inter alia in U.S. Pat. Nos. 4,600,261 and 4,634,207 (Debbaut), articles comprising an apparatus for protecting a substrate, including electrical contacts and comprising a gel of recited properties, the gel being cured prior to coming into contact with any part of the substrate to be protected, and means for deforming the gel into close and conforming contact with the substrate have found with acceptance as a particularly effective means for sealing and environmentally protecting substrates, especially when the article may be disengaged from the substrate such that the gel remains substantially within said apparatus. Especially with electrical contacts (for example, terminal posts) such as are used by telephone companies to connect the telephone line twisted pair to the line going to an individual household and which contacts are customarily placed inside a Pedestal box mounted at about ground level and exposed to the elements, sealing and encapsulating materials and articles used to protect and insulate said contacts are therefore subjected to temperatures in the range from about $-40°$ to about $60°$ or even $70°$ C., to insect damage, to water (both liquid and vapor) and must have means to enable the telephone company artisan to reenter the box and alter or repair contacts, connections, splices and wires contained therein. Such connecting means (indeed connectors generally and terminal posts in particular) are usually of high aspect ratio such that the above mentioned cured gel must be capable of withstanding considerable and repeated deformation as the protection apparatus is applied, removed and applied again. It is essential also that the gel, on removal leave no significant amount still adhering to the connector or to the bare electrical connectors attached thereto. Thus it is highly desirable that cured gels useful in these and similar applications possess excellent physical properties, including high elasticity and elongation to provide high deformability; high toughness (a combination of high elongation and tensile strength), a cohesive strength greater than its adhesive strength and greater adhesion to the apparatus containing it than to the substrate to ensure the gel remains substantially within the apparatus when it is removed; excellent tack, adhesive properties, resistance to stress relaxation and low compression set to prevent water ingress along the interface between the gel and the bare electrical conductors or connector; good stability to syneresis under compression (as hereinbelow described) to prevent shrinkage of the gel and contamination of its environment; high hydrolytic, thermal and oxidative stability; that it be moisture insensitive and that it possess excellent resistance to the damaging effects of ultra-violet (u. v.) light to enable it to survive exposure to the elements for the long service life contemplated for such devices by telephone companies.

The polyurethane gels used by the prior art have excellent short term physical properties but are poor in such long term chemical and physical properties as hydrolytic and thermal stability, resistance to moisture and resistance to compression set especially at higher temperatures within the anticipated service range (hereinafter collectively described as aging resistance). Silicone gels used by the prior art have poor physical properties, particularly low elongation and toughness; but have good thermal stability and excellent moisture insensitivity if formulated appropriately, for example, by keeping inadvertently or deliberately added ionic species to a minimum. Because of their poor physical properties, pre-cured silicone gels are not preferred materials for use in applications where encapsulation of high aspect ratio substrates, such as the hereinabove mentioned terminal posts, and/or removal and replacement of protective apparatus is required. Thus there is a widely felt need for a cured gel with excellent physical properties as described hereinabove and good thermal, hydrolytic, u. v. and oxidative stability especially a need for gels which are also moisture insensitive.

SUMMARY OF THE INVENTION

We have discovered gel compositions particularly suited for sealing and environmentally protecting substrates, especially electrical connections, which accomplish the previously recited objects and retain the desired features recited previously while providing additional benefits readily apparent to the skilled artisan from the following more detailed description. These gel compositions exhibit unexpectedly superior and useful combinations of tensile strength, elongation, toughness, accepting high levels of diluent without significant syneresis, particularly while under compression while maintaining beneficial tack properties essential for gel sealant compositions.

More specifically, in one aspect this invention provides a cured organopolysiloxane gel which contains crosslinks and unreacted crosslinkable sites, the density of the crosslinks being C crosslinks per gram and the density of the unreacted crosslinkable sites being V sites per gram and V being less than about twelve fifths preferably less than about nine fifths of C.

The term crosslink in this specification connotes a covalent bond formed by chemical reaction between two crosslinkable sites from which sites depend a total of three or more molecular segments; or at least two covalent bonds, each formed by chemical reaction between two crosslinkable sites, attaching a chemical moiety to at least two polymer chains such that the chemical moiety has at least three molecular segments depending therefrom. Typically the chemical moiety is the residue of a low molecular weight compound or a low molecular weight oligomeric material containing at least three crosslinkable sites. Specifically, the term crosslink contemplates both trifunctional (T-links) (that is crosslinks having three molecular segments depending therefrom) tetrafunctional (H-links) (that is crosslinks having four molecular segments depending therefrom) and higher functionality crosslinks.

In a second aspect this invention provides a method of forming a crosslinked organopolysiloxane gel which comprises reacting together:

1) a organopolysiloxane containing first reactive groups; and
2) at least one compound containing second reactive groups;

said second reactive groups in the compound being capable of reacting with said first reactive groups in the organopolysiloxane;
in the presence of a diluent, which is inert to said first and said second reactive groups, in an amount of from at least about 40% by weight to about 95% by weight of the combined weights of said diluent, said organopolysiloxane and said compound.

Preferably in this and the following aspect the organopolysiloxane contains an average of at least Y first reactive groups per molecule where Y is at least 2, the at least one compound contains an average of at least W second reactive groups where W is at least 2, and the sum of Y and W is at least about 5.

In a third aspect this invention provides a kit comprising a first and a second container, each of said containers comprising at least one material selected from:

(1) an organopolysiloxane containing first reactive groups) and
2) a compound containing second reactive groups; and said second reactive groups in the compound being capable of reacting with said first reactive groups in the organopolysiloxane; and 3) a diluent, which is inert to reaction with said first and said second reactive groups, in an amount of from at least about 40% by weight to about 95% by weight of the combined weights of said diluent, said organopolysiloxane and said compound;

the division of materials between said first and said second container, which are separate, being such that said organopolysiloxane and said compound are stable when said first and said second container are maintained at room temperature under storage conditions for 6 months. In a fourth aspect the present invention provides organopolysiloxane gel compositions selected from the group consisting of:

a composition having Voland hardness values of from 1 to 5 g with an ultimate elongation of at least about 1000% for example at least about 1150%, yet more preferably at least about 1400%, for example at least about 1500%, a composition having Voland hardnesses of from 5 to 40 g with an ultimate elongation of at least about 600% for example at least about 650%, yet more preferably at least about 750%, for example at least about 900%, most preferably at least about 1000%, a composition having Voland hardness values of from 40 to 125 g with an ultimate elongation of at least about 400% for example at least about 450%, yet more preferably at least about 500%, for example at least about 550%, most preferably at least about 600%, a composition having Voland hardnesses of from 125 to 375 g with an ultimate elongation of at least about 250% for example at least about 275%, yet more preferably at least about 325 %, for example at least about 375 %, most preferably at least about 425%, or mixtures thereof.

An additional aspect of this invention provides articles for protecting substrates, said articles comprising cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths preferably less than nine fifths of C.

Still another aspect of this invention comprises a substrate protectively encapsulated at least in part by a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths preferably less than about nine fifths of A still further aspect of this invention provides a method for protecting a substrate comprising:

(1) providing a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths preferably less than about nine fifths of C.

(2) applying said cured organopolysiloxane gel to said substrate such that said composition substantially encapsulates at least a portion of said substrate.

A further additional aspect of this invention provides a method for protecting a substrate comprising:

(1) providing a first means comprising a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths preferably less than about nine fifths of C.

(2) applying a force means for acting on said first means so that said cured organopolysiloxane gel is maintained in compressive contact with said substrate and substantially encapsulates at least a portion of said substrate.

BRIEF DESCRIPTION OF THE DRAWINGS

FIG. 1 illustrates how the hardness of cured organopolysiloxane gels of the invention varies with the ratio of a compound (CPD), Tetrakisdimethylsiloxysilane, to an organopolysiloxane: 10,000 centistoke (cs) viscosity vinyldimethyl-terminated polydimethylsiloxane (OPS).

FIG. 2 illustrates how the hardness of cured organopolysiloxane gels of the invention varies with the ratio of a compound: Tetrakisdimethylsiloxysilane, to an organopolysiloxane: 165,000 centistoke viscosity vinyldimethylterminated polydimethylsiloxane.

FIG. 3 illustrates how the stress relaxation over a period of 10 minutes exhibited by cured organopolysiloxane gels derived from curable compositions of an embodiment of the invention varies with the ratio of the compound to the organopolysiloxane in said curable compositions.

FIG. 4 illustrates how the tack exhibited by cured organosiloxane gels of one embodiment of the invention varies with weight ratio of compound to organopolysiloxane.

FIG. 5 illustrates how the tack exhibited by cured organopolysiloxane gels, of one embodiment of the invention varies with the unreactive diluent viscosity.

FIG. 6 illustrates how the elongation exhibited by cured organopolysiloxane gels of the invention and also the elongation of cured organopolysiloxane gels outside the scope of the present invention varies with Voland hardness.

FIG. 7 illustrates how the tensile strength exhibited by a cured organopolysiloxane gel of one embodiment of the invention and also the tensile strength of a cured organopolysiloxane gel outside the scope of the present invention varies with elongation.

FIG. 8 illustrates how the molecular weight between crosslinks of gels of the invention at a given diluent level may be selected to obtain a desired hardness range for the crosslinked organopolysiloxane gel.

DETAILED DESCRIPTION OF THE INVENTION

Preferably in all aspects and embodiments of the method and kits of the present invention the combined weights of organopolysiloxane and compound used to prepare cured organopolysiloxane gel is from about 5 to about 60% of the combined weights of diluent, organopolysiloxane and compound. Preferably the organopolysiloxanes of the methods and kits of the invention have a ratio of the weight average molecular weight of the organopolysiloxane to X, as hereinabove defined, of at least about 7,000.

Preferably in all aspects and in all embodiments of the present invention described herein the average molecular weight between crosslinks ($M_c$) of the cured organopolysiloxane gel is at least about 15,000, more preferably at least about 20,000, for example at least about 40,000, yet more preferably at least about 60,000, for example at least about 100,000, most preferable at least about 150,000 for example at least about 200,000.

Preferably in all aspects and in all embodiments of the present invention described herein the organopolysiloxane has been cured in the presence of a diluent inert under the conditions used to cure the organopolysiloxane in an amount of from about 40 to about 95% by weight of the combined weights of said organopolysiloxane and said diluent.

Preferably in all aspects and in all embodiments of the present invention described herein the gel composition has a Voland hardness of about 2 to about 375 g with an ultimate elongation of at least about 250%, more preferably a Voland hardness of about 2 to about 125 g, most preferably about 2 to about 40 g, and more preferably has an ultimate elongation of at least about 650%, for example, at least about 700%, yet more preferably at least about 800%.

Preferably, the cured gel compositions of the invention are moisture insensitive. Preferably also the cured organopolysiloxane gel compositions of the invention contain minimum amounts of ionic species as particulate sodium borate, for example less than about 1800 ppm of the weight of the composition as particulate sodium borate, more preferably less than about 1500 ppm of the weight of the composition as particulate sodium borate. Most preferably the compositions are substantially free of particulate sodium borate.

The term substantially free of particulate sodium borate when applied to curable compositions and curing or cured organopolysiloxane gels of the invention connotes that the said compositions or gels are free of added particulate sodium borate as a discrete chemical entity. This term is not intended to exclude materials, such as sodium borate containing essentially water insoluble glasses, which contain the elements of sodium borate, but not in a discrete chemical form.

In one embodiment this invention provides a crosslinked organopolysiloxane which has been crosslinked in the presence of from about 40 to about 95% by weight of a diluent (based on the combined weights of said crosslinked organopolysiloxane plus said diluent), said diluent being inert under the conditions used to crosslink the organopolysiloxane In another embodiment this invention provides a cured organopolysiloxane gel comprising from about 40% up to about 95% by weight of a diluent (based on the combined weights of the organopolysiloxane and the diluent), which diluent is inert under the curing conditions used to crosslink said organopolysiloxane and said organopolysiloxane having been crosslinked in the presence of said diluent.

The term unreacted crosslinkable sites connotes reactive sites initially present in the reaction mixture used to prepare cured organopolysiloxane gel which by virtue of stoichiometric imbalance or other reason survive the curing process without producing crosslinks or causing chain extension. As pointed out above, the average density of unreacted crosslinkable sites in the cured organopolysiloxane gel is less than about twelve fifths preferably nine fifths of C.

Preferably, if the crosslinks have an average functionality of F where F is at least 3, the ratio of the average molecular weight between cross-links to (F−1) is at least about 7,000. Preferably also, the ratio of the average distance between crosslinks to (F−1) when the organosiloxane chains are fully extended is at least about 250 Angstrom units.

Preferably each molecular segment of organopolysiloxane between reacted first reactive groups is at least 250 Angstrom units long when the molecular chains are fully extended. Generally the density of reactive crosslinkable sites in the cured composition is less than about twelve fifths of C, preferably less than about nine fifths of C; and in some embodiments the density of reactive crosslinkable sites is more preferably less than about three halves of C, for example, less than about six fifths of C, most preferably less than about four fifths of C, for example less than about three fifths of C. We have found that even when 1:1 stoichiometric ratios of compound to organopolysiloxane are used, frequently not all the reactive sites react to form crosslinks. Although we do not want to be limited to any particular explanation, this may occur because some of the reactive sites become entrapped in the crosslinked gel or are by other means prevented from reaction.

Preferably the average molecular weight between crosslinks (that is, the average molecular weight of all molecular segments which are part of the closed loop three dimensional network) in the cured organopolysiloxane gel is at least about $1300/(1-s)^2$ where s is the diluent fraction of the cured organopolysiloxane gel. More preferably, M in the cured organopolysiloxane gel is at least about $1900/(13's)^2$, most preferably at least about $2600/(1-s)^2$.

In preferred embodiments of the methods and compositions of the present invention the molar equivalent ratio of the compound or combination of compounds to the organopolysiloxane is such that a majority of the molecules of reactants are joined to one or more other molecules by at least two crosslinks (that is form closed loops which comprise at least part of a three dimensional network). More preferably in these embodiments at least about 50%, for example at least about 65%, preferably at least about 75% of the crosslinks form such closed loops.

The crosslinkable site of the invention is a reactive site capable of reacting with another reactive site to produce either chain extension or crosslinking. By chain extension is meant the reaction of an organopolysiloxane having at least 2 first reactive groups with a compound having 2 second reactive groups such that the molecular weight of the organopolysiloxane is increased without necessary formation of crosslinks. The term 'cured organopolysiloxane gel' connotes that the organopoly-siloxane has been maintained under curing conditions at a curing temperature for a sufficient time that the Voland hardness of said gel is not significantly increased if the curing time is doubled.

One embodiment of the method of the present invention contemplates reacting one or more compounds having at least three second reactive groups and at least one compound having two second reactive groups with the first reactive groups of the organopolysiloxane and of forming covalent bonds thereto. In this embodiment of the invention it is not preferred that the selected organopolysiloxane have a ratio of the weight average molecular weight to Y of at least 7000. It is preferred that the relative amounts of the compound having only 2 reactive groups per molecule and the organopolysiloxane be such that if said compound is reacted with said organopolysiloxane alone, the resultant organopolysiloxane would have a ratio of the weight average molecular weight to the average number of first reactive groups per molecule of at least 7000.

Preferably each reactive site in said organopolysiloxane and said compound is independently selected from the group consisting of vinyl, hydroxy, acyloxy, amine, oxime and alkoxy groups and hydrogen and halogen, for example chlorine, directly bonded to silicon, with the proviso that the ratio of silicon bonded hydrogens to unsaturated aliphatic groups, if both are present in the composition, is from about 0.67 to about 1.5.

Preferably the organopolysiloxane has a weight average molecular weight of at least 14,000 and is selected from one or more of:

  (I)

where each n is independently at least about 4, m is at least 1, t is from at least 2 to 4 and each main chain unit D is independently selected from the group consisting of:

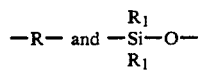

where each R is independently selected from divalent unsubstituted and substituted alkyl and aryl moieties and each $R_1$ is independently selected from substituted and unsubstituted monovalent hydrocarbon groups free of aliphatic unsaturation; and, each A is independently selected from the group consisting of a valence bond and main chain units of the structure:

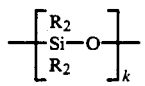

where k is from 1 to 10, preferably from 1 to 5; and each Q and Q' is independently:

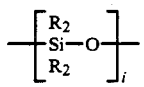

where i is from 1 to 10, preferably from 1 to 5; and X is an aliphatic aromatic or organosilyl moiety as defined hereinbelow valence bonded to t×A moieties.

The second component comprises at least one compound capable of reacting with and curing the first component and selected from the group consisting of:

1) polyunsaturated organic aliphatic, aromatic and alkyl aromatic compounds; and 2) linear, branched and cyclic organosiloxanes selected from the group having the general formulae;

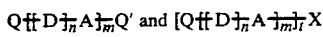 (I)

where each n is independently at least about 4, m is at least 1, t is from at least 2 to 4 and each main chain unit D is independently selected from the group consisting of:

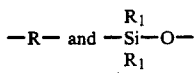

where each R is independently selected from divalent unsubstituted and substituted alkyl and aryl moieties and each $R_1$ is independently selected from substituted and unsubstituted monovalent hydrocarbon groups free of aliphatic unsaturation; and, each A is independently selected from the group consisting of a valence bond and main chain units of the structure:

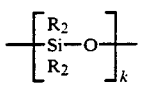

where k is from 1 to 10, preferably from 1 to 5; and each Q and Q' is independently:

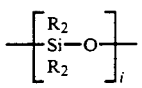

where i is from 1 to 10, preferably from 1 to 5; and X is an aliphatic aromatic or organosilyl moiety as defined hereinbelow valence bonded to t x A moieties. linear, branched and cyclic organosiloxanes having the general formula:

$$[E-J\frac{}{p}]G \qquad (II)$$

where p has a value of from 1 to 4 and J is:

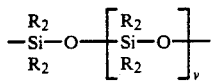

where v has a value of at least 0; and E is selected from the group consisting of a valence bond and $R_2$ groups; and G is selected from a valence bond and the group consisting of substituted and unsubstituted monovalent and polyvalent silicon atoms and carbon atoms directly linked by valence bonds to p J groups and to (4−p) $R_2$ groups.

Each $R_2$ if present in the elements A, Q, Q', J and E of the above preferred embodiments of the organopolysiloxane and compound is independently selected from the group consisting of substituted and unsubstituted monovalent hydrocarbon groups free of aliphatic unsaturation and reactive groups.

Preferably any Q or Q' group in component A not containing any reactive substituent is less than about 20, preferably less than about 10 main chains units from the nearest main chain unit containing at least one reactive group in the same molecule.

X in the reactive organopolysiloxane is preferably selected from divalent moieties such as —S—, —O—, —NR— and

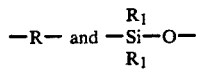

where each R is independently selected from divalent unsubstituted and substituted alkyl and aryl moieties and each $R_5$ is independently defined as above; and trivalent moieties such as —N—, —P— and —P(O)— and trivalent substituted and unsubstituted hydrocarbon groups free of aliphatic unsaturation,

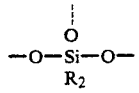

where $R_2$ is as defined above.

Preferably the number of reactive groups in each molecule of the organopolysiloxane is at least 2 and the ratio of the average total number of main chain units in the reactive organopolysiloxane of the first component to the average number of reactive groups contained therein is at least about 50, preferably at least about 100, for example 150.

The term substituted and unsubstituted monovalent hydrocarbon groups free of aliphatic unsaturation connotes alkyl, aryl, alkyl-aryl, halogen substituted groups such as chloro-or fluoro-alkyl or -aryl, cyanoalkyl and cyanoaryl.

The term 'capable of reacting with and curing said first component' connotes that the reactive sites in the first and second components are so selected that a major portion of the crosslinks formed are intermolecular (that is they are formed between different organopolysiloxane molecules) and only a minor portion of the crosslinks formed are intramolecular (that is, they are formed between reactive sites in the same organopolysiloxane molecule).

In another preferred embodiment this invention contemplates a cured organopolysiloxane gel having a Voland hardness (B) of from about 1 to about 550 g and an ultimate elongation (U) of at least about 100%, such that:

$$U \geq K \times B^{-1\Delta}$$

where K is at least about 1700, for example at least about 1800, preferably at least about 2000, for example at least about 2200, most preferably at least about 3000, for example at least about 3500. Preferably in this embodiment the Voland hardness is from 1 to 375 g and preferably the ultimate elongation is at least about 150, for example at least about 250 more preferably at least about 300%.

In a another preferred embodiment this invention contemplates a cured organopolysiloxane gel composition having a Voland hardness of from about 1 to about 550 g with an ultimate elongation (U) of at least 100% such that:

$$T_s \geq L \times \exp(-0.005 \times U)$$

where $T_s$ is the tensile strength of the composition and L is at least about 45, for example at least about 50, preferably at least about 60, for example at least about 70, most preferably at least about 80, for example at least about 90. Preferably in this embodiment also the Voland hardness is from 1 to 375 g and the ultimate elongation preferably at least about 150%, for example at least about 250%, more preferably at least about 300%.

Another preferred embodiment of this invention contemplates a crosslinked gel composition having a Voland hardness of from about 10 to about 40 g, preferably about 15 to about 40 g, most preferably about 20 to about 40 g and an ultimate elongation of at least about 1100%, more preferably at least about 1200%, most preferably at least about 1300%.

Other preferred embodiments of this invention contemplate articles and methods for protecting a substrate, which may comprise an electrical contact, which employ the cured organopolysiloxane gels as described in any one or more of the above aspects and embodiments of the present invention, and assemblies comprising a substrate at least partially encapsulated by the gel compositions as described in one or more of the above aspects and embodiments of the present invention; particularly those gels and gel compositions having the above enumerated combinations of Voland hardness and ultimate elongation properties and/or tensile strength and ultimate elongation properties.

In articles and methods of the present invention for protecting a substrate the organopolysiloxane may be pre-cured (that is, cured before coming into contact with the substrate), or cured after coming into contact with the substrate. Preferably the cured organopolysiloxane gel in all articles and methods of the present invention for sealing and protecting substrates is cured before contacting the substrate. If the organopolysiloxane is pre-cured, the articles and methods of the present invention include means for deforming the cured organopolysiloxane gel into contact, which preferably is close and conforming contact, with a substrate. Advantageously, such means for deforming the gel into contact with the substrate comprises a force means or a means for compressing the gel into contact with the substrate and/or means for maintaining the cured organopolysiloxane gel in contact with the substrate by compression.

Preferably cured organopolysiloxane gels and gel compositions of the present invention have a cohesive strength greater than the adhesive strength of the said gel or composition.

The term valence bond connotes a single covalent bond directly linking two atoms of the main chain of organopolysiloxane or compound or organopolysiloxane and compound together.

The term cured organopolysiloxane gel connotes that portion of the compositions of the invention containing siloxane or organic moieties. Thus the cured organopolysiloxane gel contains the unreactive diluent and wholly or partly reacted products derived from reaction of first and second components as described hereinabove.

The diluent may be chosen from a variety of inert diluents which are compatible with organopolysiloxanes and gels thereof. Preferably the diluent is an organosiloxane inert under the crosslinking conditions used to prepare the cured organopolysiloxane gel and having a viscosity of from about 1 to about $10^6$ centipoises (cp), preferably from about 30 to about 1000000, for example about 50 to about 30000. The molecular weight of the diluent in general may be from about 100 to about 200,000 Daltons preferably about 1,000 to about 140,000, most preferably about 4,000 to about 50,000 although the preferred and highly preferred ranges generally will depend on the diluent concentration and the average molecular weight between crosslinks as disclosed in the examples. Preferably the diluent comprises a dimethylsiloxane although in some circumstances it may be desirable to provide a methyl phenyl siloxane or mixtures and copolymeric oligomers of dimethylsiloxanes and diphenyl siloxanes, depending on the desired degree of compatibility with the crosslinked polysiloxane. We have found that at the high reactant dilutions contemplated by the instant invention, the molecular weight of the inert diluent can play a more critical role in determining the properties of the cured organopolysiloxane gel than do the diluents typically present in amounts up to about 40% by weight contemplated for use in prior art cured organopolysiloxane gels. We have discovered unexpectedly that improving one feature of the gels of the present invention can detract significantly from one or more other features The tack exhibited by the crosslinked organopolysiloxanes of the present invention in the absence of inert diluent tends to be lower than that of prior art silicone materials of similar hardness when also freed of diluent Although we do not wish to be limited to any particular theory, we believe that this is because the cured organopolysiloxane gels of the instant invention have a lower fraction of pendant or dangling chains as defined hereinabove than do the cured organopolysiloxane gels of the prior art. We have unexpectedly discovered that this can be overcome in the following ways. Firstly, the cured organopolysiloxane gels of the invention use larger amounts of inert diluent than the cured organopolysiloxane gels of the prior art which, up to a certain point, improves the tack. The amount of diluent useful in improving tack can, of course be readily determined by those of ordinary skill in the art. Secondly, we have unexpectedly found that as the molecular weight of the diluent is increased the tack exhibited by a given cured organopolysiloxane gel increases. However we have also unexpectedly discovered that as the molecular weight of the diluent, even oligomeric polydimethylsiloxane diluent, is increased, evidence of incompatibility, for example, syneresis is evidenced The term syneresis connotes the "bleeding" or exuding and exclusion from a cured organopolysiloxane gel of at least a portion of the diluent in which the cured organopolysiloxane gel was prepared or swollen. This characteristic is particularly likely to be exhibited if a cured organopolysiloxane gel containing diluent is subjected to compression. Thus, unexpectedly, there are preferred ranges of diluent molecular weight for best combinations of tack, stability to and absence of significant syneresis under compression and the other hereinabove mentioned superior physical properties desired in cured organopolysiloxane gels especially cured organopolysiloxane dielectric gel compositions. In general the greater the distance between crosslinks in the cured organopolysiloxane gel, the higher the upper limit of the preferred range of diluent molecular weights. Thus we have found that cured organopolysiloxane gels having $M_c$ values of at least about 15,000 prepared in the presence of inert diluents of number average molecular weight (Mn) between about 100 and about 15,000 exhibit especially beneficial tack properties and stability towards syneresis as described above; the more preferred range of diluent Mn is about 1000 to about 5,500; the most preferred range of diluent Mn is about 4,000 to 5,500. Cured organopolysiloxane gels having $M_c$ values of at least about 20,000 and 40,000 prepared in the presence of inert diluents of Mn from about 100 to 20,000 exhibit especially beneficial tack properties and stability towards syneresis as described above; the more preferred range of diluent Mn is about 1000 to about 10,000; the most preferred range of diluent Mn is about 4,000 to 10,000. Cured organopolysiloxane gels having $M_c$ values of from about 40,000 to about 60,000 prepared in the presence of inert diluent of Mn from about 100 to about 40,000 exhibit especially beneficial tack properties and stability towards syneresis as described above; the more preferred range of diluent Mn is about 1000 to about 20,000; the most preferred range of diluent Mn is about 4,000 to 20,000. Cured organopolysiloxane gels having $M_c$ values from about 60,000 to about 100,000 prepared in the presence of inert diluent of Mn from about 100 to about 60,000 exhibit especially beneficial tack properties and stability towards syneresis as described above; the more preferred range of diluent Mn is about 1000 to about 35,000; the most preferred range of diluent Mn is about 4,000 to 30,000. Organopolysiloxane gels having $M_c$ values from about 100,000 to about 200,000 prepared in the presence of inert diluent of Mn from about 100 to about 100,000 exhibit especially beneficial tack properties and are stable to syneresis as described above; the more preferred range of diluent Mn is about 1000 to about 55,000; the most preferred range of diluent Mn is about 4,000 to 30,000. Cured organopolysiloxane gels having $M_c$ values of at least about 200,000 prepared in the presence of inert diluent of Mn from about 100 to about 200,000 exhibit especially beneficial tack properties and stability towards syneresis as described above; the more preferred range of diluent Mn is about 1000 to about 100,000; the most preferred range of diluent Mn is about 4,000 to 30,000. It should be noted that with dimethyl siloxane oligomeric diluents of molecular weight significantly above 25,000 particular care is necessary to ensure adequate dispersing and mixing of the reactive components used to prepare the cured organopolysiloxane gel.

Stability to syneresis is measured by immersing cured gel into fresh diluent and measuring the amount of fluid uptake. Higher stability is indicated by larger diluent uptake. Stability may also be measured by compressing a cured gel sample until a pressure level is reached at which syneresis commences. Higher compression forces indicate more stable gels. Of course, as is understood by those of ordinary skill in the art, the ability to withstand compression without exhibiting syneresis depends on a number of factors including but not limited to diluent compatibility with the crosslinked organopolysiloxane, diluent concentration, the molecular weight between crosslinks of the crosslinked organopolysiloxane and the temperature of the gel.

Particularly preferred siloxanes useful for the first component of compositions of the invention include one or more of hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-methyl terminated polydimethylsiloxanes and hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-methyl terminated dimethylsiloxane copolymers with diphenyl siloxanes and non-siloxane monomers such as alkylene oxides, for example ethylene and propylene oxide and mixture thereof, divinyl benzene, styrene, and alpha-methylstyrene and tetramethyldisiloxane-ethylene, dimethylsiloxane-silphenylene and dimethylsiloxane-silphenylene oxide copolymers, dimethyl siloxane-alpha-methylstyrene and dimethylsiloxane-bis-phenol A carbonate block copolymers. These preferred siloxane polymers, copolymers and block copolymers may also contain the above indicated reactive functionalities dispersed along the main chain provided that the reactive functionalities are sufficiently far apart as indicated hereinabove.

Preferred materials for use in the second component containing reactive groups capable of reacting with and curing the first component include one or more of unsaturated aliphatic, aromatic or alkyl-aromatic compounds such as diallyl maleate, diallyl fumarate, triallyl citrate, divinyl adipate, divinyl benzene, diallyl phthalate, triallyl mellitate, tetraallyl pyromellitate, triallyl cyanurate, triallyl isocyanurate, glycerine triacrylate and trimethacrylate, pentaerythritol tri-and tetra-acrylate and -methacrylate which are examples of low molecular weight compounds containing at least three crosslinkable sites; the hereinabove mentioned preferred materials for the first component, otherwise similar materials of lower molecular weight which are examples of oligomeric materials containing at least three crosslinkable sites; and siloxanes such as tetrakis(dimethylsiloxy)silane, methyltris(dimethylsiloxy)silane, phenyl-tris(dimethylsiloxy)silane, tetraethoxysilane, tetramethoxysilane, phenyl triethoxysilane, methyl triethoxysilane, phenyl triacetoxysilane, 1,3,5,7-tetramethyltetravinyl cyclotetrasiloxane and 1,3,5,7-tetramethylcyclotetrasiloxane.

Especially when materials comprising first and second component contain vinyl groups and silicon bonded hydrogen atoms, use of a catalyst is preferred to facilitate reaction and cure. Catalysts for such reactions are well known to those of ordinary shall in the art and include platinum compounds. Suitable platinum catalysts include platinum-divinyl-tetramethyldisiloxane complex in xylene (Petrarch Systems, PC072), or in vinyl terminated polydimethylsiloxane (Petrarch Systems, PC075) or platinum-cyclovinylmethylsiloxane complex in cyclic vinylmethylsiloxanes (Petrarch Systems, PC085). Especially when the reactive groups consist only of silanol moieties, acidic or mildly basic conditions will result in condensation and curing. Organopolysiloxanes carrying reactive silanol groups may be condensed with multifunctional organosiloxanes or silanes which condense with the silanol groups. Especially suitable functionalities for such condensation are acyloxy, amine, oxime and alkoxy reactive groups. Such condensations are often catalyzed by titanates and carboxylic acid salts of zinc, iron and tin. Organopolysiloxanes and organosiloxanes of silanes carrying reactive halogen atoms bonded to silicon, for example chlorine atoms, can be cured with moisture or by reaction with, for example dimethylamine substituted organopolysiloxanes, organosiloxanes or silanes Specific examples of compounds particularly useful in the practice of this invention include, in addition to the compounds described in the examples, acetoxy terminated polydimethylsiloxane with a molecular weight of about 36,000; methyldiacetoxy terminated polydimethylsiloxane with a molecular weight of about 36,000; chlorine terminated polydimethylsiloxane with a molecular weight of 425 to 600; dimethylamine terminated polydimethylsiloxane with a molecular weight of about 425 to about 600; ethoxy terminated polydimethylsiloxane with a molecular weight of from about 360 to 1200; vinyldimethyl terminated polydimethylsiloxane with a viscosity of from about 2 to about 1,000,000 cs; vinylphenylmethyl terminated polydimethylsiloxane with a viscosity of from about 1,000 to about 100,000 cs; divinylmethyl terminated polydimethylsiloxane with a viscosity of from about 1,000 to about 100,000 cs; vinyldimethyl terminated dimethylsiloxane-methyl-vinylsiloxane (0.3–0.4%) copolymer with a viscosity of from about 1,000 cs; vinyldimethyl terminated polydimethylsiloxane vinyl Q-resin dispersion with a viscosity of from about 4,000 to about 70,000 cs; hydrogen terminated polydimethylsiloxane with a molecular weight of from about 400 to about 10,000; aminopropyldimethyl terminated polydimethylsiloxane with a molecular weight of from about 50 to about 2,000; aminobutyldimethyl terminated polydimethylsiloxane with a molecular weight of from about 50; carboxypropyldimethyl terminated polydimethylsiloxane with a molecular weight of from about 2500 to about 3500; chlorodimethyl terminated polydimethylsiloxane with a molecular weight of from about 2500 to about 3500; dimethylsiloxane-methylvinylsiloxane copolymers with from about 1.0 to about 20% of the vinyl comonomer having viscosities in the range of from about 250 to about 300,000 cs; dimethysiloxane copolymers with acryloxypropylmethyl siloxane, aminopropylmethyl siloxane, (chloromethylphenylethyl)methyl siloxane, chloropropylmethyl siloxane, chloropropylmethyl siloxane (vinyldimethylsiloxy terminated), (methacryloxy-propyl)methyl siloxane, octyloxymethyl siloxane; branched polydimethylsiloxanes having 2 to 3 (T-structure) branch points with aminoalkyl, carboxypropyl, chloropropyl, glycidoxypr-opyl, mercaptopropyl, methacryloxypropyl and vinyl reactive groups at each branch point; branched polydimethylsiloxanes having 2 to 3 (T-structure) branch points with aminoalkyl, carboxypropyl, chloropropyl, glycidoxypropyl, mercaptopropyl, methacryloxypropyl and vinyl reactive groups at each branch terminus; polymethylhydrosiloxanes having molecular weights from about 360 to about 5000; copolymers of methylhydrosiloxanes (from about 0.5 to about 60% by weight) with dimethylsiloxanes having molecular weights from about 900 to about 63,000; copolymers of methylhydrosiloxane (from about 0.5 to about 50% by weight) with phenylmethylsiloxane having mclecular weights from about 1000 to about 2,000; and silanol and vinyldimethyl terminated dimethydiphenylsiloxane copolymers having from about 3 to about 25% by weight diphenylsiloxane groups. Many of these materials may be obtained from Petrarch Systems, Inc.

The curable compositions of this invention and the compositions made according to this invention may contain various additional ingredients such as flame retardants, corrosion inhibitors, antioxidants, UV light stabilizers, fungicides and other biocides, pigments, fillers to enhance or decrease thermal or electrical conductivity and fillers to adjust density or other physical properties. Such additives or fillers also may be used to regulate or affect the rate of extent of cure and crosslinking and affect the overall cost of the final composition Particularly useful ingredients for incorporation in gels of the present invention are described in U.S. patent applications Ser. No. 063,552 filed June 16, 1987 and Ser. No. 141,949 filed Jan. 8, 1988.

Advantageously the article on which, within which or around which the curable compositions of the invention are cured is primed with a silane coupling agent. Such coupling agent are well known in the art as being advantageous for improving the bonding of addition cure silicones to substrates. These coupling agents include but are not limited to trichlorosilane, organochlorosilanes such as vinyltrichlorosilane and methylvinyldichlorosilane, organosilane esters such as methyltriethoxy and methyltrimethoxy silanes, organofunctional silanes such as vinyltrimethoxysilane and vinyltriacetoxysilane, methacryl organosilanes such as gamma-methacrloxypropyltrimethoxysilane, epoxy silanes such as beta-(3,4-epoxycyclohexyl)ethyltrimethoxysilane and amino organosilanes such as gamma-aminopropyltriethoxysilane, silane titanates and the like. Typically the coupling agent is mixed into a solvent, for example one which activates the coupling agent. The solution may be brushed onto the substrate or applied by other methods well known to those of average skill in the art such as casting, dipping spraying and the like. After application the primer coated article is allowed to sit for at least about 30 minutes so that the solvent can evaporate and the silane hydrolysed by moisture in the air. Once the priming is completed the curable compositions of the invention can be poured into on or around the substrate and cured.

As is shown in Examples 1 and 2 below typical prior art approaches to the problem of providing soft silicone gels result in cured organopolysiloxane gels having poor tensile strength and elongation properties.

A stoichiometric ratio of 1:1 corresponds to that weight ratio of reactants, for example organopolysiloxane and compound, at which a maximum in crosslink density and/or hardness is observed.

Although we do not wish to be limited to any particular theory it is believed that crosslinking by reaction of functionalized molecules, where the mole equivalent ratios are far from the stoichiometric ranges needed to achieve a crosslinked gel network having adequate physical properties, can result, not in desired intermolecular closed loop formation, but in extensive linking of chains to the cured organopolysiloxane gel structure by a very few and often only one reactive site such that many of the chains form dangling "tails" from the three dimensional cured organopolysiloxane gel. Such dangling chains, although they do form part of the cured organopolysiloxane gel and thus contribute to the cured organopolysiloxane gel fraction (that fraction of the original composition comprising organopolysiloxane and crosslinker rendered insoluble by co-reaction), make no substantial contribution to important mechanical properties of the cured organopolysiloxane gel. Thus we have discovered that the cured organopolysiloxane gels prepared by the methods of this invention having similar Voland hardness values to those of soft cured organopolysiloxane gels prepared by the methods of the prior art unexpectedly exhibit much higher ultimate elongation and toughness properties with greater tensile strength and can accept significant amounts of diluent without exhibiting syneresis especially under compression while still maintaining desirable levels of tack.

The compositions of this invention have a wide variety of uses such as sealants, dielectrics, protective tapes and coatings. These materials can be combined with or cured on various substrates or in various devices to provide sealing, insulation or protective functions. These compositions are useful in such articles and uses as are exemplified in U.S. Pat. Nos. 4,600,261, 4,634,207, 4,643,924, 4,690,831, 4,581,265, 4,610921, 4,610,738, 4,701,574, 4,600,804, 4,662,692, 4,595,635, 4,680233 and 4,647,717, the disclosures of all of which are completely incorporated herein by reference for all purposes. These compositions are also useful in various articles and uses as are exemplified by U.S. application Ser. Nos. 892,519 filed July 31, 1986; 038415 filed Apr. 9, 1987; 016296 filed Feb. 19, 1987; 901,971 filed Aug. 29, 1986; 859171 filed May 2, 1986; 071,533 filed July 9, 1987; 057,707 filed June 1, 1987; 767,555 filed Aug. 20,1985; 801,017 filed Nov. 11, 1985; 864,689 filed May 19, 1986; 912,064 filed Sept. 26, 1986; 928,064 filed Nov. 11, 1986; 132,641 filed Dec. 12, 1987; 037,747 filed Apr. 13, 1987; 063,552 filed June 16, 1987; 127,341 filed Dec. 1, 1987; 126,665 filed Dec. 1, 1987; 127,342 filed Dec. 1, 1987 and 141,949 filed Jan. 8, 1988, the disclosures of all of which are completely incorporated herein by reference for all purposes. In many of these uses, the cured or cross-linked composition of this invention will have a cone penetration according to ASTM No. D217-68 of about 100 to about 350 (mm-1) and an ultimate elongation in accordance with ASTM No. D638-80 of greater than about 200%.

In this specification it has been found useful to measure hardness and other properties of the gels useful in the present invention and the compositions of the present invention using a Voland/Stevens Texture Analyzer Model LFRA equipped with a one-fourth inch (0.25 inch or 6.35 mm) stainless steel ball probe and having a 100 g or a 1000 g load cell to measure force. For measuring the hardness of the gel materials of the present invention a 20 ml glass scintillating vial containing 10 grams of gel is placed in the Voland/Stevens Texture Analy and the stainless steel ball probe is forced into the gel at a speed of 2.0 mm a second to a penetration distance of 4.0 mm. The hardness value of the gel is the force in grams required to force the ball probe at that speed to penetrate of deform the surface of the gel the specified 4.0 mm. The Voland hardness od a given may be directly correlated to the ASTM D217 cone penetration hardness and the procedure and a correlation is shown in FIG. 3 of U.S. patent application Ser. No. 063,552 (Dittmer and Dubrow) filed June 16, 1987 and commonly assigned.

Examples 1 and 2 are not examples of the Invention.

EXAMPLE 1

Cured organopolysiloxane gel samples prepared from McGann NuSil 8170, a commercially available two component reactive silicones used to prepare cured organopolysiloxane gels were evaluated for their elongation properties The components were weighed on an analytical balance (accuracy±0.01 g) then mixed with an overhead stirrer equipped with a propeller blade. The blended mixture was then cast into a 6"×6"×0.125" mold and cured at 120° C. for four hours in an air circulating oven. Three 20 ml scintillation vials were filled with 12 g each of the mixture and cured under the same conditions. Cured organopolysiloxane gels of different hardnesses were prepared by varying the ratio of the two reactants (Table 1). The hardness was determined for each formulation using a Voland Texture Analyzer, then tensile bars were die cut from the molded slabs and their elongation measured using the procedures described in ASTM D419 (Table 2). Table 2 shows that as the ratio of the first to the second reactant is varied away from the 1:1 weight ratio towards a 1:2 weight ratio, the tensile strength increases and the elongation decreases indication that the latter ratio corresponds more closely to a 1:1 stoichiometric ratio. The hardness of sample 1-1 is higher than that of any of the other samples in this example indicating that the 1:1 stoichiometric ratio lies in a first to second reactant weight ratio range of about 1:2 and the amount of the second reactant needed for a 1:1 stoichiometric ratio may be even greater. Thus the ratio of A to B recommended by the supplier is far from a 1:1 stoichiometric ratio.

EXAMPLE 2

The same procedure was followed to evaluate the elongation of cured organopolysiloxane gel samples prepared from General Electric RTV 6186 another commercially available two component reactive silicone used to prepare cured organopolysiloxane gels (Table 1 and 2). Table 2 shows that as the ratio of the first and second reactants is varied away from the 1:1 weight ratio towards a 1:2 weight ratio, the elongation decreases indicating again that the latter ratio corresponds more closely to a 1:1 stoichiometric ratio. The hardness properties of samples 2—1 and 2—2 are approximately equivalent and greater than those of the other samples indicating that the 1:1 stoichiometric ratio lies in a first to second reactant weight ratio range of between about 1:1.7 and 1:2. Thus the ratio of A to B recommended by the supplier is far from a 1:1 stoichiometric ratio.

EXAMPLE 3

This procedure describes in general terms the method used to make the formulations of the remaining examples, which comprise examples of the invention. They are each composed of five basic ingredients.

1) The diluent: a trimethyl terminated polydimethylsiloxane, viscosity 50 centistoke (cs), obtained from General Electric (G.E. SF97-50);

2) The organopolysiloxane (OPS): vinyldimethyl terminated polydimethylsiloxanes of various viscosities, (Petrarch Systems);

3) The compound (CPD): Tetrakisdimethylsiloxysilane, (Petrarch Systems T 1915);

TABLE 1

Typical Commercial Organopolysiloxane gel Formulations

| Source: Sample # | McGann-Nusil 1st g | McGann-Nusil 2nd g | General Electric 1st g | General Electric 2nd g | 1st:2nd Ratio |
|---|---|---|---|---|---|
| 1-1 | 33.33 | 66.66 | — | — | 1:2 |
| 1-2 | 37.00 | 63.00 | — | — | 1:1.7 |
| 1-3 | 45.00 | 55.00 | — | — | 1:1.2 |
| 1-4 | 50.00 | 50.00 | — | — | 1:1 |
| 1-5 | 54.00 | 46.00 | — | — | 1:0.85 |
| 2-1 | — | — | 37.00 | 63.00 | 1:1.7 |
| 2-2 | — | — | 33.33 | 66.66 | 1:2 |
| 2-3 | — | — | 45.00 | 55.00 | 1:1.2 |
| 2-4 | — | — | 47.50 | 52.50 | 0.9:1 |

TABLE 1-continued

Typical Commercial Organopolysiloxane gel Formulations

| Source: | McGann-Nusil | | General Electric | | |
|---|---|---|---|---|---|
| Sample # | 1st g | 2nd g | 1st g | 2nd g | 1st:2nd Ratio |
| 2-5 | — | — | 50.00 | 50.00 | 1:1 |

Note on Table 1: The ratio of part 1 and Part 2 recommended by the Manufacturer is 1:1; however to obtain harder cured organopolysiloxane gels this ratio may be varied.

TABLE 2

Physical Properties of Typical Commercial Formulations

| Sample Number | Company Name | Hardness (g) | Elongation (%) | Tensile Strength (g) | Stress Relaxation (%) |
|---|---|---|---|---|---|
| 1-1 | McGann-Nusil | 100.2 | 360 | — | — |
| 1-2 | " | 71.9 | 370 | 4.0 | — |
| 1-3 | " | 26.1 | 450 | 3.8 | 4.2 |
| 1-4 | " | 12.8 | 500 | 1.8 | 5.0 |
| 1-5 | " | 6.4 | 550 | Too low | 14.5 |
| 2-1 | General Elect. | 117.7 | 320 | — | — |
| 2-2 | " | 116.4 | 290 | — | — |
| 2-3 | " | 37.1 | 460 | — | — |
| 2-4 | " | 29.6 | 540 | — | — |
| 2-5 | " | 17.5 | 550 | — | — |

4) A Platinum Catalyst: 3-4% Pt in silicone oil, (McGann NuSil Cat-50); and

5) A cure inhibitor: 1,3,5,7-Tetravinyltetramethylcyclotetrasiloxane (Petrarch Systems T 2160).

Ingredient 4 is used at a concentration of 8 ppm of the mixture for all the formulations and ingredient 5 is used at a concentration of 60 ppm. The ingredients were weighed sequentially and then mixed as described in example 1. The formulations were then poured into scintillation vials and cured to provide specimens for the hardness and stress relaxation measurements and also into a slab mold and cured to provide specimens for the other tests. The cure conditions were as described in example 1.

EXAMPLE 4

Stoichiometric curves were generated for cured organopolysiloxane gels prepared by the method of example 3 using vinyl terminated polydimethylsiloxanes of various viscosities. This was done by varying the weight ratio of the compound to the vinyl terminated polydimethylsiloxane at a constant diluent level. The hardness of each of the cured formulations was determined as described in example 1 and curves of hardness versus compound to organopolysiloxane weight ratio were generated (FIGS. 1 and 2). The curve maximum, considered to be the hardness peak corresponding to a stoichiometric ratio of 1:1 and corresponds generally to an molar equivalent ratio (in terms of the reactive groups—vinyl and silicon bonded hydrogen) of about 1:1. The average molecular weight between crosslinks of samples 1 to 14 is at least about 14,000.

TABLE 3

FORMULATIONS PREPARED IN ACCORDANCE WITH EXAMPLE 3

| Sample No. | OPS Viscosity (cs) | | | CPD (g) | Fluid (50 cs) | Ratio of CPD to OPS | Stoichiometric ratio (H:Vi) |
|---|---|---|---|---|---|---|---|
| | $10^3$ vinyl (g) | $10^4$ vinyl (g) | $1.65 \times 10^5$ vinyl (g) | | | | |
| 1 | 40 | — | — | 0.640 | 59.0 | 0.016 | 1:1 |
| 2 | 28 | — | — | 0.488 | 72.0 | 0.016 | 1:1 |
| 3 | 20 | — | — | 0.320 | 80.0 | 0.016 | 1:1 |
| 4 | — | 50 | — | 0.255 | 50.0 | 0.0051 | 1:1 |
| 5 | — | 40 | — | 0.204 | 60.0 | 0.0051 | 1;1 |
| 6 | — | 30 | — | 0.153 | 70.0 | 0.0051 | 1:1 |
| 7 | — | 21 | — | 0.107 | 79.0 | 0.0051 | 1:1 |
| 8 | — | 15 | — | 0.077 | 85.0 | 0.0051 | 1:1 |
| 9 | — | — | 60 | 0.135 | 40.0 | 0.00225 | 1:1 |
| 10 | — | — | 50 | 0.113 | 50.0 | 0.00225 | 1:1 |
| 11 | — | — | 40 | 0.080 | 60.0 | 0.002 | 0.89:1 |
| 12 | — | — | 40 | 0.100 | 60.0 | 0.0025 | 1.11:1 |
| 13 | — | — | 40 | 0.060 | 60.0 | 0.0015 | 0.66:1 |
| 14 | — | — | 35 | 0.079 | 65.0 | 0.00225 | 1:1 |

Notes on Table 3:
1) H:Vi is the ratio of the weight of the compound to the weight of the organopolysiloxane normalized to that weight ratio at which the hardness peak is observed,
2) In all formulations the exact amount of diluent added was sufficient to bring the total sample weight up to 100.00 g.
3) The vinyl terminated polydimethylsiloxane (OPS) having a viscosity of 1000 cs (Petrarch silicone fluid No. PS443) had a weight average molecular weight of 28,000; that having a viscosity of 10,000 cs (Petrarch silicone fluid No. PS445) had a molecular weight of 63,000 and that having a viscosity of 165,000 cs (Petrarch silicone fluid No. PS448.5) had a weight average molecular weight of 160,000.

Stress relaxation measurements were made on cured organopolysiloxane gels prepared as described in example 3 using a 165,000 centistoke siloxane as the organopolysiloxane. The measurements were made using a Voland Texture Analyzer. For each measurement, a specimen contained and cured in a vial was placed on the instrument which was set so that the probe could be maintained at a penetration depth of 4 mm. The initial force needed to obtain this penetration and the subsequent decay in the force needed to maintain this penetration was measured on a chart recorder. The percent decay of the force needed over a period of 10 minutes plotted against the weight ratio of the compound to the organopolysiloxane is shown in FIG. 3.

EXAMPLE 6

Elongation measurements were made on the formulations from Table 2 prepared using the 1000 centistoke, 10,000 centistoke and 165,000 centistoke vinyl polymer as the organopolysiloxane. The values obtained are presented in Table 4.

EXAMPLE 7

This example illustrates the use of a chain extending second compound, 1,1,3,3,5,5-hexamethyltrisiloxane (Petrarch Systems, H7322) to increase the molecular weight between crosslinks when an organopolysiloxane comprising a vinyl terminated polydimethylsiloxane having a molecular weight between reactive groups much less than 10,000 is used. The formulation used a ratio of chain extender to first compound of 10:1 and a 1:1 stoichiometric ratio of organopolysiloxane reactant to first plus second compound and was as described below:

Unreactive Diluent: Trimethyl terminated polydimethylsiloxane, 43.78 g, viscosity 50 cs;

Organopolysiloxane: Vinyldimethyl terminated polydimethylsiloxane, 10.38 g, viscosity 1000 cs;

First compound: Tetrakisdimethylsiloxysilane, 0.023 g

Second compound 1,1,3,3,5,5-Hexamethyltrisiloxane, 0.143 g

The materials were mixed and cured as in example 3. The unreactive diluent constitutes 73% by weight of the composition. The cured organopolysiloxane gel exhibited a hardness of 23 g. and an elongation of 1,050%. By comparison sample 2 of example 2, which is not a composition of the invention, uses the same ingredients in essentially the same proportions but omits the chain extender; Table 4 shows that the cured organopolysiloxane gel of sample 2 had an elongation of 190%.

EXAMPLE 9

Tack measurements were made on the samples prepared in example 4. Tack is measured by recording the force needed to withdraw the probe of the Voland texture analyzer from wetting contact with the surface of the cured organopolysiloxane gel. The initial penetration depth of the probe was 4 mm and the withdrawal speed was 2 mm/sec. The force needed to withdraw the probe in grams is a measure of the tack. FIG. 4 shows the relation between tack and the weight ratio of compound to organopolysiloxane (which is proportional to the stoichiometric ratio).

TABLE 4

PHYSICAL PROPERTIES OF SAMPLES PREPARED ACCORDING TO EXAMPLE 3.

| Sample Number | Viscosity of component 1 (cs) | Hardness (g) | Elongation (%) | Tensile Strength (psi) | Stress Relaxation (%) | Tack (g) |
|---|---|---|---|---|---|---|
| 1 | 1000 | 499 | 160 | 17.5 | — | — |
| 2 | 1000 | 238 | 190 | 12.9 | — | — |
| 3 | 1000 | 126 | 220 | 7.0 | — | — |
| 4 | 10,000 | 542 | 280 | 24.5 | — | — |
| 5 | 10,000 | 373 | 310 | 20.8 | — | — |
| 6 | 10,000 | 227 | 375 | 18.0 | — | — |
| 7 | 10,000 | 114 | 475 | 8.3 | — | — |
| 8 | 10,000 | 48 | 625 | 3.6 | — | — |
| 9 | 165,000 | 119 | 1200 | 9.7 | — | 4.0 |
| 10 | 165,000 | 67 | 1450 | 15.1 | 44 | 3.0 |
| 11 | 165,000 | 44 | 1300 | 14.0 | 41 | — |
| 12 | 165,000 | 42 | 1450 | 11.4 | 35 | — |
| 13 | 165,000 | 38 | >1500 | 6.5 | 50 | — |
| 14 | 165,000 | 30 | 1550 | 15.1 | 40 | 4.0 |

EXAMPLE 10

Tack measurements were made on cured organopolysiloxane gels prepared using unreactive diluents of various viscosities. The 165,000 cs viscosity vinyl terminated polydimethylsiloxane was used as the organopolysiloxane. Other ingredients were as listed in Example 3 except that the fluid viscosity of the diluent was varied between 50 and 5000 cs. The ratios of the ingredients were those of Table 2, Sample 14. The procedure for measuring tack is described in Example 9. FIG. 5 demonstrates the relationship between unreactive diluent viscosity and tack.

EXAMPLE 11

To show the influence of the average number of reactive sites per molecule in the second component, the procedure of Example 3 was followed using the 165,000 cs viscosity vinyl terminated polydimethylsiloxane as the organopolysiloxane. Other ingredients were as listed in Example 3 except that the compound containing 4 reactive groups (silicon bonded hydrogen atoms) was replaced by dimethylhydrosiloxane-dimethylsiloxane copolymers having an average of 11 (Petrarch PS123), 6 (Petrarch PS123.5) and 5 (Petrarch PS124.5) reactive silicon bonded hydrogen atoms per molecule and the diluent used was a Union Carbide polydimethylsiloxane with a viscosity of 350 cs (45-350). In two further experiments the above mentioned Petrarch PS123 was chain extended with the chain extender of Example 7. A 1:1 stoichiometric ratio of reactants was used in all these compositions to prepare cured organopolysiloxane gels. Table 5 lists Voland hardness, elongation and tensile strength values obtained for these cured organopolysiloxane gels.

EXAMPLE 12

Example 7 was repeated using an unreactive diluent having a viscosity of 350 cs (Union Carbide silicone fluid 45-350) instead of the 50 cs diluent. The cured organopolysiloxane gel obtained had a hardness of 23 g and an elongation of about 1000%.

EXAMPLE 13

The procedure and ingredients of Example 3 were used to prepare a cured organopolysiloxane gel, except that for the organopolysiloxane, 100,000 cs divinylmethyl terminated polydimethylsiloxane (Petrarch Systems, PS488) and for the compound, 500 cs hydrodimethyl terminated polydimethylsiloxane Table 5: Effect of Changing Total Reactive Groups and Molecular Weight in the Second Component

| Sample No. | Compound Reactive Groups/ molecule | Mol. Wt. | Molar Ratio of second to first compound | Hardness (g) | Elongation (%) | Tensile Strength (g) |
|---|---|---|---|---|---|---|
| 15 | 11 | 2100 | | 103 | 550 | 10.5 |
| 16 | 6 | 2300 | | 46 | 900 | |
| 17 | 5 | 13,000 | | 23 | 1100 | |
| 18 | 11 | 2100 | 8:1 | 37 | 1200 | 8.5 |
| 19 | 11 | 2100 | 13:1 | 24 | 1500 | 4.8 |

(Petrarch Systems, PS 542) were used. Two formulations were reacted: the first (Sample 20) comprised 49.0 g diluent, 15.6 g PS488 and 5.44 g PS542 and the second (Sample 21) comprised 53.9 g diluent, 11.9 g PS488 and 4.17 g PS542. Sample 21 had a Voland hardness of 63 g, an elongation of 870% and a tensile strength of 6.0 psi and sample 22 had a Voland hardness of 36 g, an elongation of 1,150% and a tensile strength of 5.6 psi.

EXAMPLE 14

From measurements of tack and stability to syneresis including but not limited to those made on the gels of the examples of the present invention, an estimation was made of the preferred limits to the number average molecular weight of the diluent ($Mn_d$) at various diluent concentrations for a dimethylsiloxane diluent and crosslinked polydimethylsiloxane (X-PDMS) having a range of $M_c$ values at least about the values of column 1 of Table 6 below. The corresponding preferred, more preferred and most preferred ranges of inert diluent number average molecular weight are also given in Table 6 below.

EXAMPLE 15

Estimation of $M_c$, Average Molecular Weight between crosslinks

A disc-shaped specimen of the cured organopolysiloxane gel composition (approximately 2.5 cm radius and 0.1 to 0.2 cm thick) is prepared and soaked in toluene (or other swelling agent for the cured organopolysiloxane gel and suitable extractant for the soluble components of the composition) for 2 to 3 days, periodically replenishing the toluene or other extractant (for example, twice a day). The swollen organopolysiloxane gel is then dried in a vacuum oven at about 60°–80° C. (or other suitable temperature) for 24 hours to remove the extractant. If necessary an intermediate exchange of the extractant with, for example, acetone may be used to facilitate and speed up removal of the extractant. This dried organopolysiloxane gel is then placed between parallel plates in a Rheometrics Mechanical Spectrometer (RMS) at 25°. The plateau modulus $G_p$ (in dynes per cm$^2$) is then determined using a frequency rate of oscillation of the plates of 1 to 100 rad per second. From this modulus value a $M_c$ can be calculated from the relation:

$$M_c = (d \times R \times T)/G_p$$

where d is the density (in g per cm$^3$) of the extracted organopolysiloxane gel, R is the gas constant and T is the absolute temperature.

In the case of gels which contain fillers, the contribution of the filler to the modulus must be taken into account. In this instance the measured modulus ($G_f$) is related to the modulus by:

$$(G_f) = G_p(1 + 2.5\phi + 14.1\phi^2)$$

where $G_p$ is the modulus contribution from the network alone in the absence of filler and $\phi$ is the volume fraction of the filler in the diluent free gel. The weight fraction of filler can be determined by Thermo-gravimetric analysis (TGA): this involves pyrolysing the crosslinked polymer composition and determining the residual weight of the filler. The crosslink density may be determined as follows the number of network segments per unit volume v is related to $M_c$ by the following relation:

$$C = 2/(M_c \times F)$$

If F is not known independently (through, for example, knowledge of the reactive ingredients from which the gel was produced) it is assumed to be 3.

Unreacted reactive groups in a cured gel composition may be identified and their concentration estimate using a number of techniques such as infra-red absorption and nuclear magnetic resonance (NMR). At present the preferred method is solid state (usually proton) NMR. The chemical shifts observed can be used to identify the type of functional groups present; once the relaxation times are determined, their number can also be determined.

EXAMPLE 17

A curable composition of the invention was prepared from the following ingredients:

1) The diluent: a trimethyl terminated polydimethylsiloxane, viscosity 1000 centistoke (cs), obtained from Dow Corning (200 Fluid, 40 g $M_n$ about 13,000);

2) An organopolysiloxane vinyldimethyl terminated polydimethylsiloxane of viscosity 65,000 cs ($M_w$ about 116,000, supplied by Petrarch Systems, Inc. as PS447.6);

3) A compound: Tetrakisdimethylsiloxysilane, (0.024 g, Petrarch Systems T1915); and 4) A Platinum Catalyst, 3–4% Pt in xylene (Petrarch Systems PC072—8 ppm)

The curable composition was poured into the terminal recesses of a 5 pair Pedestal terminal block made by Raychem Corporation and sold (as an article containing a non-silicone gel) under the designation DTerminator PMT terminal. The recesses had been previously primed with SP/135, a proprietary silane titanate in solution in VM and P naphtha (85% w/w) with less than 5% n-propanol, less than 5% n-butanol and less than 5% methyl cellosolve supplied by McGann Nusil Corpn. Substantially equivalent results may be obtained by the use of CFI/135, another silane titanate from the same supplier). This and other terminal blocks for telephone drop wire pairs which advantageously may use the gels of the invention in addition to those referenced hereinabove are described in U.S. patent application Ser. Nos. 70,475 filed July 7, 1987; 157,399 filed Feb. 17, 1988; 130,347 filed Dec. 8, 1987 now abandoned in favor of Ser. No. 270,411 filed Nov. 7, 1988 (Taiwan patent application number 77107405 filed Oct. 26, 1988) and Ser. No. 246,399 filed Sept. 17, 1988; and also in related U. S. applications Ser. No. 102,072 filed Sept. 29, 1987; 164,261 and 164,301 both filed Mar. 4, 1988 and 231,755 filed Aug. 12, 1988 (Taiwan patent application number 77107163 filed Oct. 17, 1988), the disclosures of all of the above applications are completely incorporated herein by reference for all purposes. Wire pairs were conductively secured to the connector terminals and the whole block was in a first test immersed in water. After 14 days the number of the connector wire/gel assemblies having an insulation resistance of 10,000 Megohms had decreased from an initial value of 10 to 9. By contrast the number of the connector-wire-gel assemblies in a block containing silicone gel of the prior art (corresponding to Example 1 sample 1—1) having an insulation resistance of 10,000 Megohms had decreased from an initial value of 10 to 5. In a second test further terminal blocks prepared as described above were placed in a 70° oven and the insulation resistance of the connector-wire-gel assemblies determined after 10 and 20 days by immersion in water and measurement with a megohmeter. After 10 and 20 days respectively the number of prior art silicone containing assemblies having an insulation resistance of 10,000 Megohms had decreased from an initial value of 10 to 1; out of 4 blocks tested containing the silicone gel of the invention the Megohms had decreased from an initial value of 10 to 9, 9, 8 and 8 after 10 days and 8, 7, 6, and 4 after 20 days.

EXAMPLE 18

Samples were prepared of a polyurethane gel used commercially in Raychem Corporation TermSeal ® termination covers and DTerminator TM terminals. The polyurethane gel had a Voland Hardness of about 20 c (cone penetration of 26 mm$^{-1}$) and an ultimate elongation which varied between 500 and 700% and had good tack. After between 300 and 600 hours exposure to ultraviolet light in a QUV Weatherometer, the gel had zero tack. Two gels of the invention were prepared using the method and ingredients of example 3 with the exception that a vinyldimethyl terminated organopolysiloxane of viscosity 160,000 was used as the first component and the inert diluent, used in 75 concentration by weight of the cured gel, and was selected from two dimethylsiloxanes of viscosity 350 and 1000 cs. A cured gel containing the 350 cs diluent had a Voland hardness of about 20, a tensile strength of 6.8 psi and an ultimate elongation of 1350% with good tack. After 600 hours in the Weatherometer the tack had increased about 40%. A cured gel containing the 1000 cs diluent had a Voland hardness of about 20, a tensile strength of 6.4 psi and an ultimate elongation of 1350% with very good tack. After 600 hours in the Weatherometer the tack remained unchanged.

FIG. 6 illustrates how the elongation (U) of gels of the invention designated as samples 2, 3, 5 to 8, and 9 to 14 and also gels 1—1 to 1—5 and 2—1 to 2—5 (which are not gels of the invention) varies with Voland hardness (B). Superimposed on this graph are lines indicating the relation:

$$U \leq K \times B^{-\frac{1}{2}}$$

where K is 1700, 2000, 2200, 30000, and 3500.

FIG. 7 illustrates how the tensile strength ($T_s$, psi) of gels of the invention designated as samples 2, 3, 5 to 8 and 9 to 14 and also gels 1—1 to 1—3 (which are not gels of the invention) varies with elongation. Superimposed on this graph is a line indicating the relation:

$$T_s \geq 45 \times \exp(-0.005 \times U)$$

FIG. 8 illustrates how Voland hardness contours of these gels are related to the diluent fraction(s) and to the average molecular weight ($M_c$) between crosslinks. Superimposed on this graph are lines corresponding to the relation:

$$M_c = Z/(1-s)^2$$

where Z is equal to 1300, 1900, and 2600. The gels of the invention exhibit properties which place them below the dashed line for Z=1300.

TABLE 6

| $M_c$ of X-PDMS | Preferred Diluent Number Average Molecular Weight Range | | |
|---|---|---|---|
| | Preferred Mn$_d$ Range | More preferred Mn$_d$ Range | Mn$_d$ ranges for most preferred balance of tack and stability |
| about 15,000 | about 100 to about 15,000 | about 1000 to about 5,500 | about 4,000 to about 5,500 |
| about 20,000 | about 100 to about 20,000 | about 1000 to about 10,000 | about 4,000 to about 10,000 |
| about 40,000 | about 100 to about 40,000 | about 1000 to about 20,000 | about 4,000 to about 20,000 |
| about 60,000 | about 100 to about 60,000 | about 1000 to about 35,000 | about 4,000 to about 30,000 |
| about 100,000 | about 100 to about 100,000 | about 1000 to about 55,000 | about 4,000 to about 30,000 |
| about 150,000 | about 100 to about 150,000 | about 1000 to about 70,000 | about 4,000 to about 30,000 |
| about 200,000 | about 100 to about 200,000 | about 1000 to about 100,000 | about 4,000 to about 30,000 |

We claim:

1. A cured organopolysiloxane gel which (a) has a Voland hardness of from about 1 g to about 525 g and an ultimate elongation of at least about 100%; (b) has an average molecular weight between crosslinks of at least about 15,000; and (c) contains crosslinks and unreacted crosslinkable sites, the density of the crosslinks being C crosslinks per gram and the density of the unreacted crosslinks being V sites per gram and the ratio V/C being less than about twelve fifths.

2. A gel according to claim 1 wherein the ratio V/C is less than about nine fifths.

3. A gel according to claim 1 which is moisture insensitive.

4. A gel according to claim 1 which is substantially free of particulate sodium borate.

5. A composition comprising a cured organopolysiloxane gel, said composition having a Voland hardness (B) in the range of from about 1 g to about 525 g and an ultimate elongation (U) of at least 100% such that:

$$U \leq K \times B^{-\frac{1}{2}}$$

where K is a constant having a value of about 1700.

6. A composition comprising a cured organopolysiloxane gel, said composition having a Voland hardness of from about 1 g to about 525 g with an ultimate elongation (U) of at least 100% such that:

$$T_s \geq L \times \exp(-0.005 \times U)$$

where $T_s$ is the tensile strength of the composition and L is a constant having a value of about 45.

7. A crosslinked organopolysiloxane composition selected from the group consisting of:
a gel composition having a Voland hardness in the range of from 1 g to 5 g with an ultimate elongation of at least about 1000%,
a gel composition having a Voland hardness in the range of from 40 to 125 g with an ultimate elongation of at least about 400%,
and mixtures thereof.

8. An article for protecting a substrate comprising a cured organopolysiloxane gel composition selected from the group consisting of:
a composition having a Voland hardness in the range of from 1 g to 5 g with an ultimate elongation of at least about 1000%,
a composition having a Voland hardness in the range of from 40 g to 125 g with an ultimate elongation of at least about 400%,
and mixtures thereof.

9. A crosslinked organopolysiloxane gel composition having a Voland hardness of from about 10 g to about 40 g and an ultimate elongation of at least about 1100%.

10. A composition according to claim 6 wherein the tensile strength of the composition ($T_s$) is given by:

$$T_s \geq L \times \exp(-0.005 \times U)$$

where L is a constant having a value of about 45.

11. A composition comprising a cured organopolysiloxane gel, said composition having a Voland hardness (B) in the range of from about 1 g to about 525 g and an ultimate elongation (U) of at least 100% such that:

$$U \leq K \times B^{-\frac{1}{2}}$$

where K is a constant having a value of about 3000.

12. A composition comprising a cured organopolysiloxane gel, said composition having a Voland hardness of from about 1 g to about 525 g with an ultimate elongation (U) of at least 100% such that:

$$T_s \geq L \times \exp(-0.005 \times U)$$

where $T_s$ is the tensile strength of the composition and L is a constant having a value of about 80.

13. A crosslinked organopolysiloxane composition selected from the group consisting of:
  a gel composition having a Voland hardness in the range of from 5 g to 40 g with an ultimate elongation of at least about 600%,
  a gel composition having a Voland hardness in the range of from 125 g to 375 g with an ultimate elongation of at least about 250%, and mixtures thereof.

14. A crosslinked organopolysiloxane composition comprising (i) a cured organopolysiloxane gel (a) having a Voland hardness of from about 1 g to about 525 g and an ultimate elongation of at least about 100%; (b) having an average molecular weight between crosslinks of at least about 15,000; and (c) containing crosslinks and unreacted crosslinkable sites, the density of the crosslinks being C crosslinks per gram and the density of the unreacted crosslinks being V sites per gram and the ratio V/C being less than about twelve fifths and (ii) an inert diluent having a number average molecular weight in the range of from 100 to 200,000, the diluent being present in an amount from about 40% to about 95% by weight of the combined weights of the cured organopolysiloxane gel and the inert diluent.

15. A composition according to claim 14, wherein the diluent has a number average molecular weight in the range of from 100 to 10,000.

16. A composition according to claim 14, wherein the cured organopolysiloxane gel has an average molecular weight between crosslinks of at least 20,000 and the inert diluent has a number average molecular weight in the range of from 100 to 20,000.

17. A composition according to claim 14, wherein the cured organopolysiloxane gel has an average molecular weight between crosslinks of at least 40,000 and the inert diluent has a number average molecular weight in the range of from 100 to 40,000.

18. A composition according to claim 14, wherein the cured organopolysiloxane gel has an average molecular weight between crosslinks of at least 60,000 and the inert diluent has a number average molecular weight in the range of from 100 to 60,000.

19. A composition according to claim 14, wherein the cured organopolysiloxane gel has an average molecular weight between crosslinks of at least 100,000 and the inert diluent has a number average molecular weight in the range of from 100 to 100,000.

20. A composition according to claim 14, wherein the cured organopolysiloxane gel has an average molecular weight between crosslinks of at least 150,000 and the inert diluent has a number average molecular weight in the range of from 100 to 150,000.

21. A composition according to claim 14, wherein the cured organopolysiloxane gel has an average molecular weight between crosslinks of at least 200,000 and the inert diluent has a number average molecular weight in the range of from 100 to 200,000.

22. An article for protecting a substrate comprising a cured organopolysiloxane gel composition selected from the group consisting of:
  a composition having a Voland hardness in the range of from 5 g to 40 g with an ultimate elongation of at least about 600%,
  a composition having a Voland hardness in the range of from 125 g to 375 g with an ultimate elongation of at least about 250%,
  and mixtures thereof.

* * * * *